(12) United States Patent
Chang et al.

(10) Patent No.: US 6,376,643 B1
(45) Date of Patent: Apr. 23, 2002

(54) METHOD OF POLYMERIZATION OF LACTIDE AND POLYLACTIDE HOMOPOLYMER THEREOF

(75) Inventors: Wen Chung Chang, Taipei; Wei-Hsiang Sun, Shin-Diann, both of (TW)

(73) Assignee: Invigor Biotechnology Co., Ltd., Taipei (TW)

( * ) Notice: Subject to any disclaimer, the term of this patent is extended or adjusted under 35 U.S.C. 154(b) by 0 days.

(21) Appl. No.: 09/710,038

(22) Filed: Nov. 8, 2000

(51) Int. Cl.[7] .................................................. C08G 63/08
(52) U.S. Cl. ........................ 528/354; 528/355; 528/357; 528/359; 525/415
(58) Field of Search ................................. 528/354, 355, 528/357, 359; 525/415

(56) References Cited

U.S. PATENT DOCUMENTS

| | | | | |
|---|---|---|---|---|
| 5,801,224 A | * | 9/1998 | Narayan et al. | 528/357 |
| 5,906,783 A | * | 5/1999 | Narayan et al. | 528/357 |
| 5,969,089 A | * | 10/1999 | Narayan et al. | 528/359 |

* cited by examiner

*Primary Examiner*—P. Hampton-Hightower

(57) ABSTRACT

This invention relates to a method of polymerization of lactide or glycolide (GA) monomers and in particular to a method of polymerizing one type of the monomers or two types of the monomers using alkyl aluminum catalyst to proceed with bulk or solution polymerization to prepare biodegradable homopolymers or copolymers, and high-molecular-weight homopolymers of polylactide (PLA), polyglycolide (PGA), or copolymers of lactide/glycolide prepared thereof.

12 Claims, 3 Drawing Sheets

METHOD OF POLYMERIZATION OF LACTIDE AND POLYLACTIDE HOMOPOLYMER THEREOF

FIELD OF THE INVENTION

This invention relates to a method of polymerization of lactide or glycolide (GA, glycolic acid) monomers and in particular to a method of polymerization of one type of the monomers or two types of the monomers using alkyl aluminum catalyst to proceed with bulk or solution polymerization to prepare biodegradable homopolymers or copolymers, and high-molecular-weight homopolymers of polylactide (PLA), polyglycolide (PGA), or copolymers of lactide/glycolide thereof.

BACKGROUND OF THE INVENTION

Homopolymers or copolymers of lactide or glycolide are non-toxic, biocompatible, and biodegradable. They can be used as biodegradable medical devices such as implant fixation devices, e.g., bone skews, pins, staples, meniscus arrows, bone plates, surgical sutures, etc. There is no way to process conventional polymers of lactide or glycolide to form fixation devices with strong mechanical strength since molecular weights of the polymers are not high and reduced in processing of polymers such as in injection molding and compression molding. It is desirable in the art to seek a novel and simple method of polymerizing lactide or glycolide to prepare high-molecular-weight polylactide or polyglycolide polymer which is non-toxic, biocompatible, biodegradable and has good mechanical strength. The polymer material can be further processed to fixation devices such as bone skews, bone plates, surgical sutures which can be implanted safely and has enough mechanical strength to fix tissues.

SUMMARY OF THE INVENTION

The object of the present invention is to provide a method of polymerization of D,L-lactide and/or glycolide using alkyl aluminum catalyst to carry out bulk or solution polymerization to prepare poly(D,L-lactide)-PDLLA, polyglycolide, or copolymers of lactide/glycotide.

The further object of the present invention is to provide a PDLLA homopolymer with a weight-average molecular weight of 900,000–1,000,00. The PDLLA homopolymer is non-toxic, biodegradable and has good biocompatibility and mechanical strength. This polymer material can be used as non-toxic and implantable medical devices and processed by conventional methods such as injection molding or compression molding to prepare fixation devices with good mechanical strength, e.g., bone skews, pins, staples, meniscus arrows, and bone plates, etc.

The PDLLA can be used as guided cell regeneration materials, absorbable sutures, or microtubular tissue regeneration guide channels such as repair of injured nerves, nerve regeneration channels. It can be applied as carriers of drug release control system and reinforcing materials for bone fracture. The other applications of the PDLLA are fibrillar products, burns dressing, absorbant papers or swabs, sponge for hemostasis, and dental packs.

The advantages of the polymerization method of the present invention are simple reaction steps, simple control of the reaction, short reaction time-reaction is complete in 3 to 12 hours. This method can prepare a high-molecular-weight poly(D,L-lactide) homopolymer with good mechanical strength which can be further processed to fixation devices with good mechanical strength. The method can also be applied to polymerize L-lactide monomers to high-molecular-weight poly(L-lactide) homopolymers, D-lactide monomers to high-molecular-weight poly(D-lactide) homopolymers, other lactide monomers to high-molecular-weight polylactide homopolymers, glycolide monomers to high-molecular-weight polyglycolide homopolymers, lactide and glycolide monomers to high-molecular-weight copolymers of lactide/glycolide.

DETAILED DESCRIPTION OF PREFERRED EMBODIMENTS

The lactide monomer in accordance with the present invention is D,L-lactide, the chemical formula thereof is shown by formula (I):

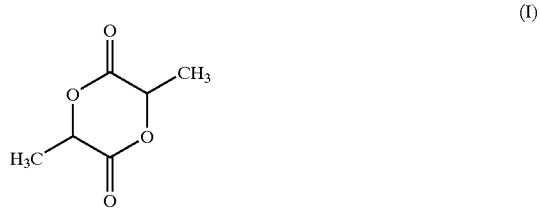

(I)

The chemical formula of poly(D,L-lactide), PDLLA, prepared according to the present invention is shown by formula (II)

(II)

The present invention can be applied to D,L-lactide monomers to carry out bulk or solution polymerization in the presence of alkyl aluminum catalyst to prepare homopolymers or copolymers of D,L-lactide. The polymerization reaction can be complete in 3–12 hours. After reaction is complete, organic solvents are used to dissolve polymers prepared, and then carry out precipitation, drying to obtain purified poly(D,L-lactide) polymers.

The catalyst in accordance with the present invention is alkyl aluminum, e.g., triethyl aluminum, diethyl aluminum alkoxide, Me$_3$Al-H$_2$O, triisobutyl aluminum [Al(i-Bu)$_3$], aluminum isopropoxide, aluminum alkoxide, which is generally in solution form by mixing with solvents. The amount of catalyst used in the process is in an amount of below 5% with respect to the total weight of monomers. The reaction is carried out at ambient atmospheric conditions, reaction temperature is controlled between 100–200° C. After reaction carries out for some time, cool the reaction system to stop the reaction.

After the reaction is complete, polylactide polymers need to be purified to be separate from the reaction system. Dissolve polylactide polymers in organic solvents, then precipitate the polymer and dry the polymer under vacuum conditions to obtain the purified polymer product.

Gel permeation chromatography (GPC) is used to determine weight-average molecular weight $M_w$ and number-average molecular weight $M_n$ and calculate $M_w/M_n$, using polystyrene as molecular weight standard and tetrahydrofuran (THF) as solvent. Polylactide polymers, homopolymers or copolymers, are dissolved in THF at 37° C., measure the intrinsic viscosity [η] and calculate viscosity-average molecular weight Mη of the polymer according to formula (III):

$$[\eta] = 0.000104 \times M\eta^{0.75} \quad \text{(III)}$$

Further, degree of polymerization (n) of polylactide homopolymers can be calculated according to formula (IV)

$$n = \text{molecular weight of polylactide homopolymers} \div 72 \quad \text{(IV)}$$

Differential scanning calorimeter (DSC) is used to determine glass transition temperature $T_g$ of polymers and study melting point of polymers.

The present invention will be better understood from the following Examples which are merely for the purpose of illustration and by no means of any limitation therefor.

EXAMPLE 1

Figure 1:
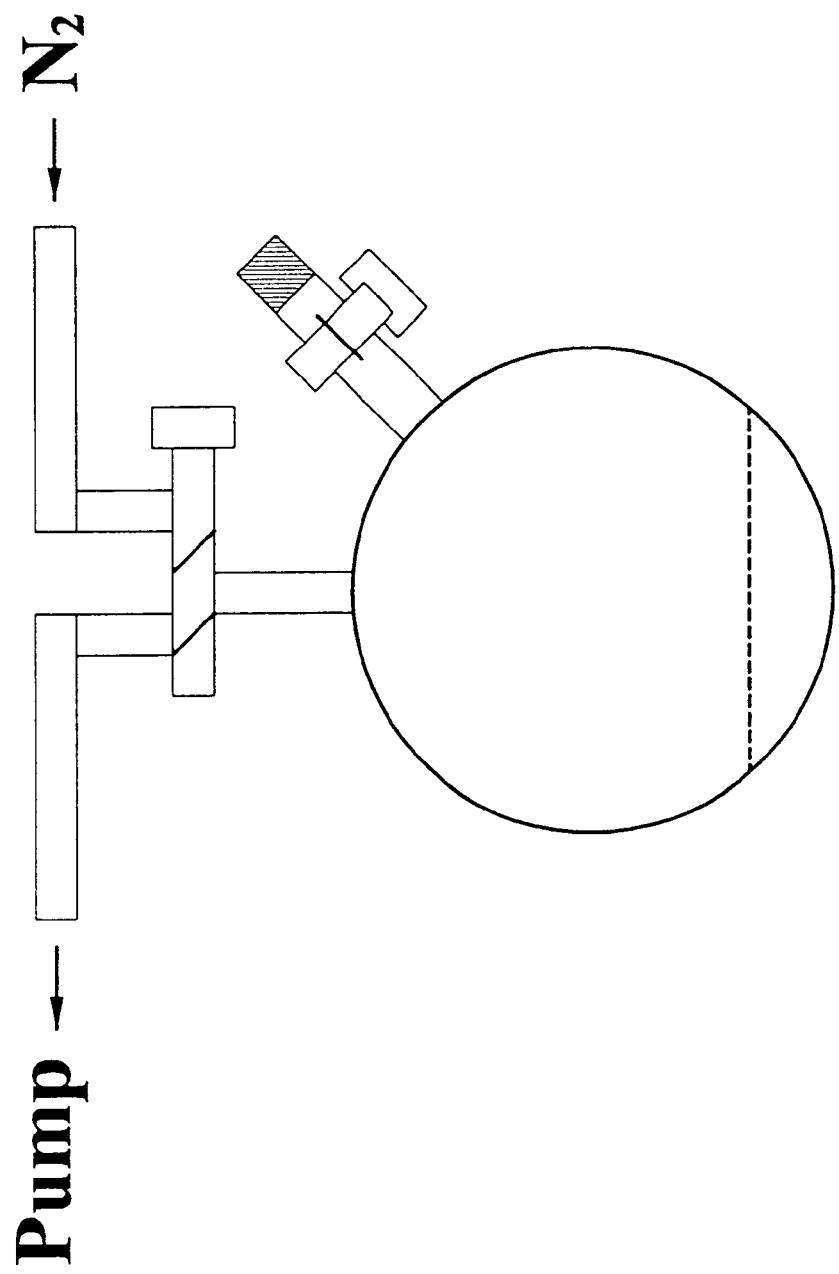
FIG. 1 is a diagram showing the reactor configurations of polymerization of lactide monomers.

The reaction of polymerization of lactide is carried out according to the following steps (reactor configuration is shown in FIG. 1):

1. Place 54 g D,L-lactide in 1000 ml flask reactor, heat it above 100° C. and use an oil pump to obtain a vacuum in the flask.
2. Under the condition of the temperature of the flask in the range of 125–160° C. and of nitrogen gas filled in the flask, add 0.12 ml of 1M Al(i-Bu)$_3$ benzene solution to the flask. Agitate the solution of the flask using magnetic stirrers for a period of time, and then cool it to stop the reaction.

Figure 2:
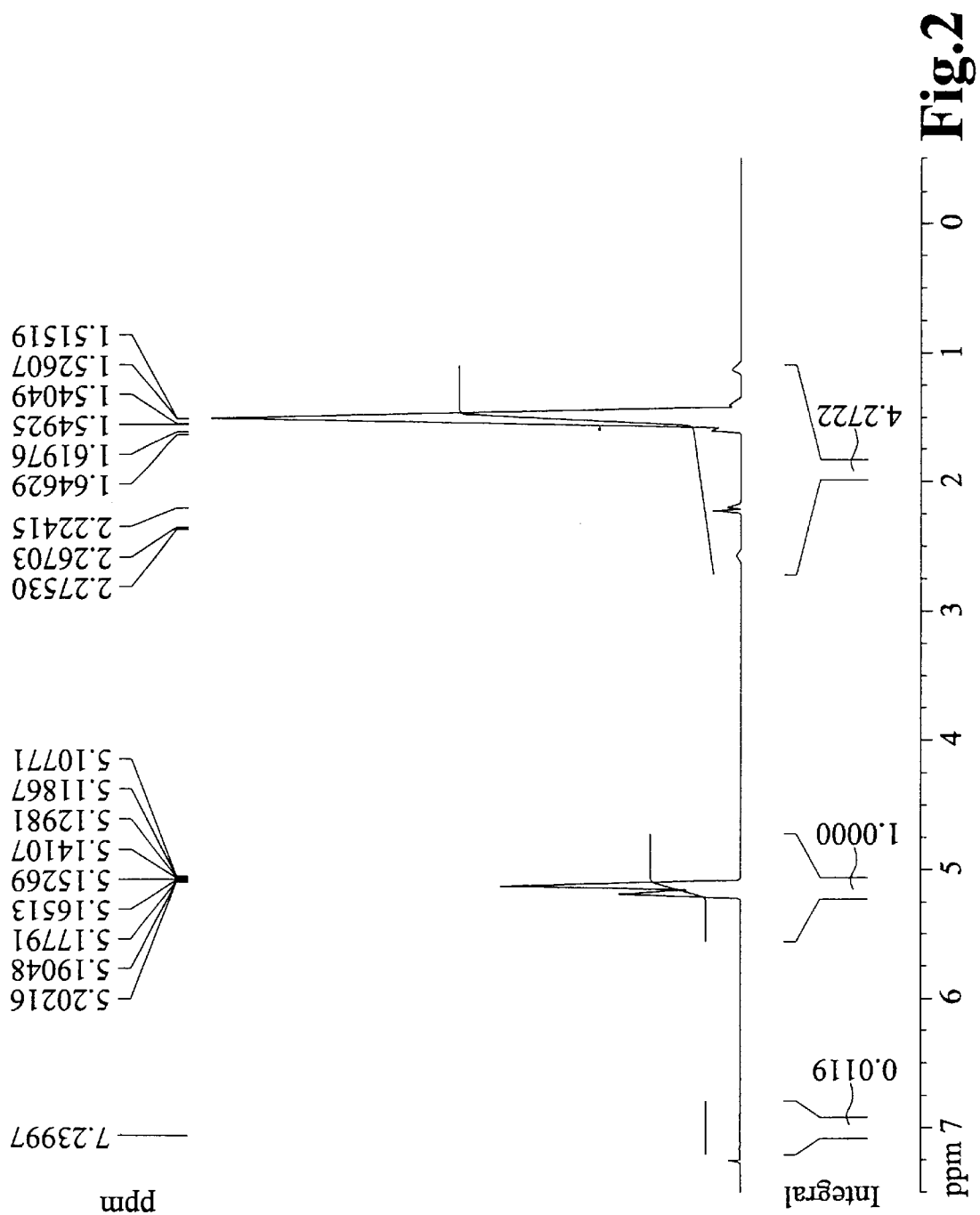
FIG. 2 shows a NMR$^1$H spectrum of PDLLA of the present invention.
Figure 3:
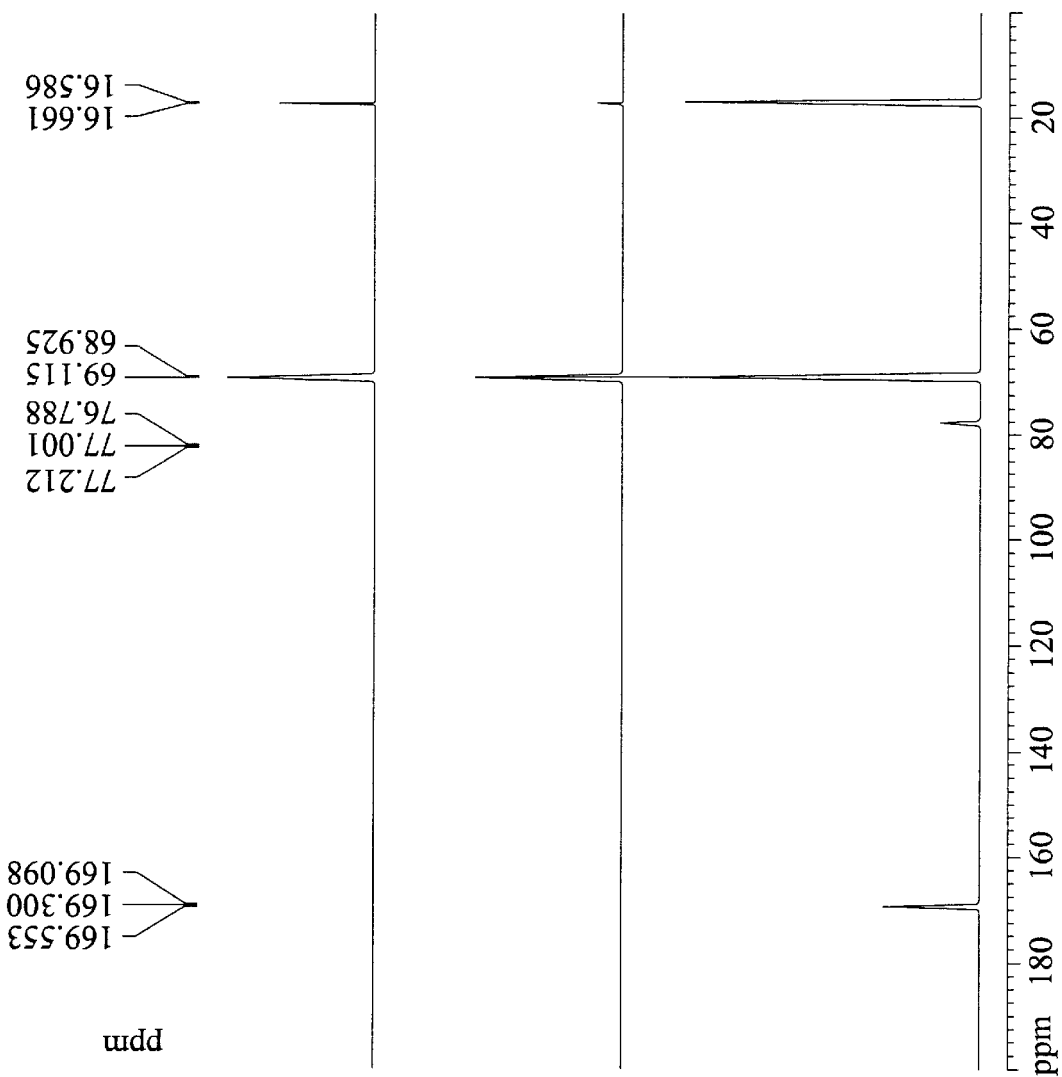
FIG. 3 shows a NMR$^{13}$C spectrum of PDLLA of the present invention.

In step 2, agitate the solution which is viscous state after adding catalyst, then magnetic stirrers stop moving. Carry out the reaction for 3–5 hours, and then cool the flask to stop the reaction. Dissolve polymerized product poly(D,L-lactide) in acetone, proceed with water precipitation, and dry the precipitated product under vacuum conditions to get white purified poly(D,L-lactide). $M_w$ and $M_w/M_n$ of the poly(D,L-lactide) are 983,127, 2.5 respectively as determined by GPC. The degree of polymerization is 13,654 according to formula (IV). Dissolve the poly(D,L-lactide) in THF at 37° C. to measure the intrinsic viscosity [η] as 3.59 dl/g and obtain viscosity-average molecular weight Mη as 1,123,952 according to formula (III). Glass transition temperature $T_g$ of the poly(D,L-lactide) is 55–60° C. as determined by DSC. DSC studies of the poly(D,L-lactide) show that there is no distinguished melting point, it indicates the poly(D,L-lactide) is amorphorous material. In addition, the other physical properties of the poly(D,L-lactide) are measured as follows:

density=1.0–1.5 g/cm$^3$, tensile stress=30–40 MPa, bending stress=75–85 MPa, elongation=8–12%. NMR$^1$H spectrum and NMR$^{13}$C spectrum of the poly(D,L-lactide) are shown in FIG. 2 and FIG. 3 respectively.

EXAMPLE 2

The reaction of polymerization of D,L-lactide is carried out according to steps 1 and 2 of Example 1 except 0.15 ml of 1M Al(i-Bu)$_3$ benzene solution is added to the flask in step 2.

In step 2, agitate the solution which is viscous state after adding catalyst, then magnetic stirrers stop moving. Carry out the reaction for 3–5 hours, and then cool the flask to stop the reaction. Dissolve polymerized product poly(D,L-lactide) in acetone, proceed with water precipitation, and dry the precipitated product under vacuum conditions to obtain white purified poly(D,L-lactide). $M_w$ and $M_w/M_n$ of the poly(D,L-lactide) are 968,725, 2.4 respectively as determined by GPC. The degree of polymerization is 13,454 according to formula (IV). Dissolve the poly(D,L-lactide) in THF under 37° C. to measure the intrinsic viscosity [η] as 3.55 dl/g and obtain viscosity-average molecular weight Mη as 1,107,286 according to formula (III). Glass transition temperature $T_g$ of the poly(D,L-lactide) is 55–60° C. as determined by DSC. DSC studies of the poly(D,L-lactide) show that there is no distinguished melting point, it indicates the poly(D,L-lactide) is amorphorous material. In addition, the density of the poly(D,L-lactide) is measured as 1.0–1.5 g/cm$^3$.

EXAMPLE 3

The reaction of polymerization of D,L-lactide is carried out according to steps 1 and 2 of Example 1 except 40 g D,L-lactide is placed in 1000 ml flask reactor in step 1 and 0.15 ml of 1M Al(i-Bu)$_3$ benzene solution is added to the flask in step 2.

In step 2, agitate the solution which is viscous state after adding catalyst, then magnetic stirrers stop moving. Carry out the reaction for 3–5 hours, and then cool the flask to stop the reaction. Dissolve polymerized product poly(D,L-lactide) in acetone, proceed with water precipitation, and dry the precipitated products under vacuum conditions to obtain white purified poly(D,L-lactide). $M_w$ and $M_w/M_n$ of the poly(D,L-lactide) are 881,071, 2.3 respectively as determined by GPC. The degree of polymerization is 12,237 according to formula (IV). Dissolve the poly(D,L-lactide) in THF at 37° C. to measure the intrinsic viscosity [η] as 3.29 dl/g and obtain viscosity-average molecular weight Mη as 1,000,499 according to formula (III). Glass transition temperature Tg of the poly(D,L-lactide) is 55–60° C. as determined by DSC. DSC studies of the poly(D,L-lactide) show that there is no distinguished melting point, it indicates the poly(D,L-lactide) is amorphorous material. In addition, the density of the poly(D,L-lactide) is measured as 1.0–1.5 g/cm$^3$.

EXAMPLE 4

The reaction of polymerization of D,L-lactide is carried out according to steps 1 and 2 of Example 1 except the reaction time is longer than that of Example 1.

In step 2, agitate the solution which is viscous state after adding catalyst, then magnetic stirrers stop moving. Carry out the reaction for 8–10 hours, and then cool the flask to stop the reaction. Dissolve polymerized product poly(D,L-lactide) in acetone, proceed with water precipitation, and dry the precipitated product under vacuum conditions to obtain white purified poly(D,L-lactide). $M_w$ and $M_w/M_n$ of the poly(D,L-lactide) are 975,414, 2.5 respectively as determined by GPC. The degree of polymerization thereof is 13,547 according to formula (IV). Dissolve the poly(D,L-lactide) in THF at 37° C. to measure the intrinsic viscosity [η] as 3.57 dl/g and obtain viscosity-average molecular weight Mη as 1,115,611 according to formula (III). Glass transition temperature $T_g$ of the poly(D,L-lactide) is 55–60° C. as determined by DSC. DSC studies of the poly(D,L-lactide) show that there is no distinguished melting point, it indicates the poly(D,L-lactide) is amorphorous material. In addition, the density of the poly(D,L-lactide) is measured as 1.0–1.5 g/cm$^3$.

The poly(D,L-lactide) obtained in the above examples can be processed by injection molding or compression molding to prepare fixation devices such as bone skews, bone pins of various shapes, sizes which can be implanted to fix tissues. In the processing, the molecular weight of polymers is reduced. Therefore conventional biodegradable materials can not be processed to fixation devices with strong mechanical strength since the molecular weights of the materials are not high. The poly(D,L-lactide) prepared by the present invention has a high molecular weight, Mw of which is 900,000–1,000,000. Therefore, the poly(D,L-lactide) is good to be processed to various fixation devices without the drawback of conventional biodegradable materials.

The method of polymerization of D,L-lactide disclosed in the present invention can be applied to polymerize D-lactide, L-lactide, the mixtures thereof, other lactide, and glycolide, etc., to prepare high-molecular-weight homopolymers or copolymers of polylactide/polyglycolide.

Although preferred embodiments have been described to illustrate the present invention, it is apparent that changes and modifications in the described embodiments can be carried out without departing from the scope of the invention intended to be limited only by the appended claims.

What is claimed is:

1. A poly(D,L-lactide) homopolymer, said homopolymer being amorphous and comprising a weight-average molecular weight $M_w$ of about 900,000 to about 1,000,000.

2. The poly(D,L-lactide) homopolymer according to claim 1, wherein said homopolymer further comprises a glass transition temperature $T_g$ of about 55° to about 60° C.

3. The poly(D,L-lactide) homopolymer according to claim 1, wherein said homopolymer further comprises a ($M_w/M_n$) of about 2.1 to about 2.7.

4. The poly(D,L-lactide) homopolymer according to claim 1, wherein said homopolymer further comprises an intrinsic viscosity [η] of about 3 dl/g to about 4 dl/g as measured in tetrahydrofuran at about 37° C.

5. The poly(D,L-lactide) homopolymer according to claim 1, wherein said homopolymer further comprises a density of about 1.0 g/cm$^3$ to about 1.5 g/cm$^3$.

6. The poly(D,L-lactide) homopolymer according to claim 1, wherein said homopolymer further comprises:
   a) a glass transition temperature $T_g$ of about 55° C. to about 60° C.; and
   b) a ($M_w/M_n$) of about 2.1 to about 2.7.

7. The poly(D,L-lactide) homopolymer according to claim 1, wherein said homopolymer further comprises:
   a) a ($M_w/M_n$) of about 2.1 to about 2.7; and
   b) an intrinsic viscosity [η] of about 3 dl/g to about 4 dl/g as measured in terahydrofuran at about 37° C.

8. The poly(D,L-lactide) homopolymer according to claim 1, wherein said homopolymer further comprises:
   a) a glass transition temperature $T_g$ of about 55° C. to about 60° C.; and
   b) an intrinsic viscosity [η] of about 3 dl/g to about 4 dl/g as measured in terahydrofuran at about 37° C.

9. The poly(D,L-lactide) homopolymer according to claim 1, wherein said homopolymer further comprises:
   a) a glass transition temperature $T_g$ of about 55° C. to about 60° C.;
   b) a ($M_w/M_n$) of about 2.1 to about 2.7; and
   c) an intrinsic viscosity [η] of about 3 dl/g to about 4 dl/g as measured in terahydrofuran at about 37° C.

10. The poly(D,L-lactide) homopolymer according to claim 1, wherein said homopolymer further comprises:
    a) a glass transition temperature $T_g$ of about 55° C. to about 60° C.;
    b) a ($M_w/M_n$) of about 2.1 to about 2.7;
    c) an intrinsic viscosity [η] of about 3 dl/g to about 4 dl/g as measured in terahydrofuran at about 37° C.; and
    d) a density of about 1.0 g/cm$^3$ to about 1.5 g/cm$^3$.

11. A method of polymerization of D,L-lactide monomer, comprising the step of performing bulk polymerization of said D,L-lactide monomer in the presence of triisobutyl aluminum Al(i-Bu)$_3$, said bulk polymerization being performed at a temperature in the range of about 125° C. to about 160° C.

12. The method according to claim 11, wherein said triisobutyl aluminum Al(i-Bu)$_3$ is in an amount of below about 3% by weight with respect to the total weight of said D,L-lactide monomer.

* * * * *